(12) United States Patent
Zhang

(10) Patent No.: US 8,804,579 B2
(45) Date of Patent: Aug. 12, 2014

(54) METHODS, SYSTEMS AND DEVICES FOR WIRELESS DEVICES HAVING MULTIPLE WIRELESS MODULES

(75) Inventor: Xuejun Zhang, Shanghai (CN)

(73) Assignee: NXP B.V., Eindhoven (NL)

( * ) Notice: Subject to any disclaimer, the term of this patent is extended or adjusted under 35 U.S.C. 154(b) by 830 days.

(21) Appl. No.: 12/867,256

(22) PCT Filed: Feb. 25, 2009

(86) PCT No.: PCT/IB2009/050768
§ 371 (c)(1),
(2), (4) Date: Aug. 19, 2010

(87) PCT Pub. No.: WO2009/107081
PCT Pub. Date: Sep. 3, 2009

(65) Prior Publication Data
US 2010/0309825 A1    Dec. 9, 2010

Related U.S. Application Data

(60) Provisional application No. 61/031,280, filed on Feb. 25, 2008.

(51) Int. Cl.
*H04B 7/005* (2006.01)

(52) U.S. Cl.
USPC .......................................... 370/278; 370/319

(58) Field of Classification Search
USPC ................... 370/278, 276, 310–350
See application file for complete search history.

(56) References Cited

U.S. PATENT DOCUMENTS

| 2007/0066245 A1* | 3/2007 | Snider ............................ 455/78 |
| 2007/0077898 A1 | 4/2007 | Mueller et al. |
| 2007/0183348 A1* | 8/2007 | Totsuka et al. ................ 370/276 |

FOREIGN PATENT DOCUMENTS

| DE | 10 2007 019313 | 11/2007 |
| EP | 1 670 147 A2 | 6/2006 |
| WO | 2005/034376 A1 | 4/2005 |
| WO | 2006/085139 A2 | 8/2006 |
| WO | 2007/099413 A1 | 9/2007 |
| WO | 2007/148143 A1 | 12/2007 |

OTHER PUBLICATIONS

International Search Report and Written Opinion for Int'l. Patent Appln. No. PCT/IB2009/050768 (Feb. 25, 2009).

* cited by examiner

*Primary Examiner* — Dady Chery

(57) ABSTRACT

Wireless communications devices, methods and systems are implemented in various fashions. According to one such implementation, a method is used in a device using time-division-multiple access and multiple-mode wireless modules. Logic generates a signal indicative (304) of a first (e.g., TV) wireless module (150) being active. In a first state where the first wireless module (150) is active, a switch connects a transmitter of a second (e.g., cellular) wireless module (100) to a duplexer (202). In a second state where the first wireless module is not active, logic connects the transmitter of the second wireless module (100) to an antenna (102) while bypassing the duplexer (202). Logic connects, in the first state, the duplexer (202) to the antenna (102) and connects, in the second state, the transmitter to the antenna while bypassing the duplexer (202). The duplexer (202) connects a receiver of the second wireless module (100) to the antenna (202) and includes a transmit band pass filter designed with a rejection band near an operating band of the first wireless module (150).

19 Claims, 4 Drawing Sheets

METHODS, SYSTEMS AND DEVICES FOR WIRELESS DEVICES HAVING MULTIPLE WIRELESS MODULES

The present invention relates generally to methods, systems and devices for use with wireless transceivers, and more specifically, to mitigating interference between multiple modules.

Wireless communication systems are used in an ever growing number of applications. Many wireless devices are becoming increasing versatile by providing functionality previously offered in several wireless devices. Such devices often implement multiple receiver and/or transmitter modules to provide the versatility.

For example, cell phones are being designed to include more bands and more modes than in the past. Under certain circumstances this can give rise to problems that degrade phone operation. If a signal transmitted by a handset reaches a simultaneously operating receiver in the same handset at a strong enough level, it can saturate ("jam") that receiver, and prevent that receiver from receiving information. Transmitters also produce noise, such as random low level signals occurring outside the intended band of transmission. If noise produced by a handset transmitter reaches a simultaneously operating receiver in the same handset at a strong enough level and at the frequency of operation of the receiver, it can degrade the signal-to-noise ratio of that receiver ("desense" that receiver), decreasing the ability of that receiver to accurately receive/decode information.

Various aspects of the present invention are directed to methods, systems and transceivers for use with wireless devices having multiple bands, modes and wireless modules.

Consistent with one embodiment of the present invention, a transceiver is implemented for use in a system using time-division-multiple access and multiple wireless modules including a first wireless module having a receiver that receives data at first frequency band and a transmitter (Tx) that sends data at second frequency band and including a second wireless module having a receiver (Rx) that receives data operating at third frequency band. The transceiver includes the first wireless module, an antenna and a duplexer having a transmit band pass filter designed with a rejection band near the third frequency band. A first switch is included that, in a first state, routes the data from the transmitter of the first wireless module through the duplexer to a second switch and that, in a second state, routes the data from the transmitter to the second switch by bypassing the duplexer. A second switch is included that, in the first state, routes the data from the transmitter and through the duplexer to the antenna, and that, in the second state, routes the data from the transmitter to the antenna while bypassing the duplexer. The first and second states are responsive to a signal indicative of an active state of the second wireless module.

Consistent with one embodiment of the present invention, a method is used in a device using time-division-multiple access and multiple-mode wireless modules. Logic generates a signal indicative of a first wireless module being active. In a first state where the first wireless module is active, a switch connects a transmitter of a second wireless module to a duplexer. In a second state where the first wireless module is not active, logic connects the transmitter of the second wireless module to an antenna while bypassing the duplexer. Logic connects, in the first state, the duplexer to the antenna and connects, in the second state, the transmitter to the antenna while bypassing the duplexer. The duplexer connects a receiver of the second wireless module to the antenna and includes a transmit band pass filter designed with a rejection band near an operating band of the first module.

Consistent with one embodiment of the present invention, a system is implemented for using time-division-multiple access communications. A first wireless module has a receiver that receives data at first frequency band and a transmitter that sends data at second frequency band. A second wireless module has a receiver that receives data operating at third frequency band. A duplexer has a transmit band pass filter designed with a rejection band near the third frequency band. A first switch, in a first state setting, routes the data from the transmitter of the first wireless module through the duplexer and, in a second state setting, routes the data from the transmitter by bypassing the duplexer. A second switch, in the first state, routes the data from the transmitter to the antenna through the duplexer and, in the second state, routes data from the first switch to an antenna while bypassing the duplexer. The first and second states are responsive to a signal indicative of an active state of the second wireless module.

The above summary is not intended to describe each embodiment or every implementation of the present disclosure. The figures and detailed description that follow more particularly exemplify various embodiments.

The invention may be more completely understood in consideration of the following detailed description of various embodiments of the invention in connection with the accompanying drawings, in which.

Figure 1:
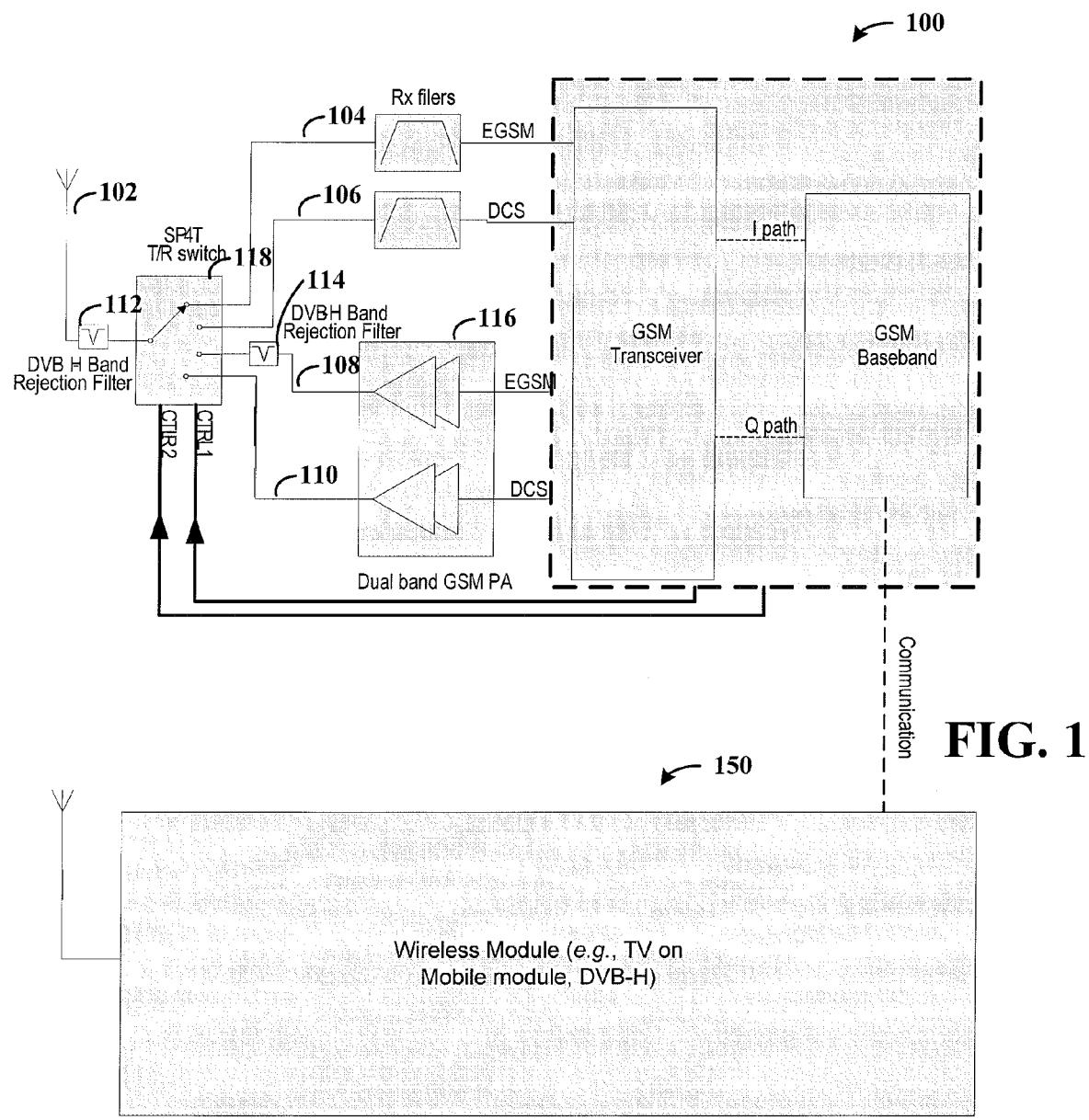
FIG. 1 shows a block diagram of a system with a television (TV) band rejection filter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

The present invention is believed to be applicable to a variety of different types of processes, devices and arrangements for use with multiple wireless modules, and in particular, to approaches for mitigating inter-module interference between a cellular module and a television (TV) module. While the present invention is not necessarily so limited, various aspects of the invention may be appreciated through a discussion of examples using this context.

Embodiments of the present invention relate to a device that has multiple wireless communications modules. The modules operate on different frequency bands. Interference between the bands is mitigated using a duplexer. The duplexer includes a receive band pass filter and a transmit band pass filter. The transmit band pass filter attenuates the transmissions of a first module that are within the frequency band of a receiver of not only the first module, but also the second module.

In one embodiment of the present invention, logic is provided to control a switch. The logic is responsive to an indication as to whether the second module is actively receiving data. If the second module is actively receiving data, the logic controls the switch so that the transmit band pass filter of the duplexer attenuates frequencies within the band of the receiver of the second module, thereby attenuating transmit noise interference. If the second module is not actively receiving data, the logic controls the switch so that the transmit band pass filter of the duplexer is not used or is otherwise bypassed. This can be particularly useful for reducing the transmission insertion loss due to the transmit band pass filter of the duplexer during periods when the second module is inactive. Thus, the transmitter does not need to compensate (e.g., by increasing power) for the transmit band pass filter of the duplexer when the second module is inactive, allowing for power savings. For certain applications the second module may be switched off for a majority of the time resulting in increased power savings.

A specific embodiment of the presenting invention involves using a first module for cellular communications and a second module for mobile television communications. Global System for Mobile communications (GSM) is one example of a cellular communications protocol. While GSM protocols use different bands for transmitting and receiving signals, the bands for transmitting and receiving are close to one another and could potentially cause interference with one another. To avoid such issues, GSM uses a time-division-multiple access (TDMA) protocol with 8 user timeslots per frame in a 200 kHz channel. Like other TDMA systems, staggered transmit and receive timeslots allow half-duplex operation using, for example, a transmit/receive switch.

In some instances the cellular phone can be multi-band capable, such as a first band in the Digital-Cellular System (DCS or GSM 1800) and a second band in the Extended-GMS (EGSM or GSM 900). The cellular phone can also be multi-mode capable, such as including Wideband Code Division Multiple Access (WCDMA) function. A specific type of secondary module receives mobile television transmissions, such as those provided using the Digital Video Broadcasting-Handheld (DVB-H) protocol. While the following discussion and related figures are directed toward such and DCS, EGSM, WCDMA and DVB-H protocols, the invention is not so limited. On the contrary, various other transmission protocols are also envisioned including, but not limited to, Terrestrial Integrated Services Digital Broadcasting (ISDB-T), Terrestrial Digital Multimedia Broadcasting (T-DMB), MediaFLO® (F-L-O stands for Forward Link Only), Digital Multimedia Broadcast-Terrestrial/Handheld (DMB-T/H), China Multimedia Mobile Broadcasting (CMMB), DVB-T, DVB-T2, PGSM, RGSM and TGSM, TD-SCDMA (Time Division Synchronous CDMA) and 3GPP-LTE (Long Term Evolution).

FIG. 1 shows a block diagram of a system consistent with an example embodiment of the traditional architecture design. A single-pole, four-throw (transmit/receive) switch 118 (SP4T or T/R switch) connects to antenna 102. SP4T also connects to four different ports used by cellular module 100. The first port 104 is the receive port for the EGSM band. The second port 106 is the receive port for the DCS band. The ports 108 and 110 are the transmit ports for the EGSM and DCS bands, respectively. Thus, ports 104 and 108 are used by an EGSM transceiver, while ports 106 and 110 are used by a DCS transceiver.

Example control logic for a T/R switch is operable in four states (see, e.g., Table 1).

TABLE 1

| State | CTRL1 | CTRL2 | RF Path |
|---|---|---|---|
| 0 | 0 | 0 | ANT-EGSM Rx |
| 1 | 0 | 1 | ANT-EGSM Tx |
| 2 | 1 | 0 | ANT-DCS Rx |
| 3 | 1 | 1 | ANT-DCS Tx |

Where transmission and reception occur simultaneously on different modules a frequency-band selective rejection filter device is used to prevent "desense" of the DVB-H receiver 150. The DVB-H band rejection filter can be placed in one of the two places. The rejection filter 114 is placed between the power amplifier (PA) 116 and the T/R switch. This filter passes the transmitted signal with minimal attenuation, but provides high attenuation to any noise produced in the receive band of DVB-H, to mitigate desense. The filter can be implemented using one or more filter types including, but not limited to, notch-filters, band-pass filters, low-pass filters and high-pass filters. A rejection filter 112 can also be placed between the T/R switch and the antenna 102. In this manner, interference from the transmitter and seen at the receiving port of TV module is mitigated by the filter 112 applied to the GSM transmit port. The filter 112 passes both the cellular transmit signal and the received signal with minimal attenuation, but provides high attenuation to any signal produced in the receive band of DVB-H, to prevent "desense".

More specifically, a DVB-H band rejection filter is inserted between antenna and the T/R switch or T/R switch and PA. The DVB-H band rejection filter can suppress the spurious noise of GSM transmission on the DVB-H reception band.

Although depicted separately, it is understood that the various combinations of components may be implemented as a single chipset (e.g., to save cost and space) with respect to each of the various embodiments described herein. For example, the antenna switch may be combined into a chip set with the antenna 102, the power amplifier 116, the EGSM and DCS receive filter, and/or the band rejection filter(s) 112 or 114.

Figure 2:
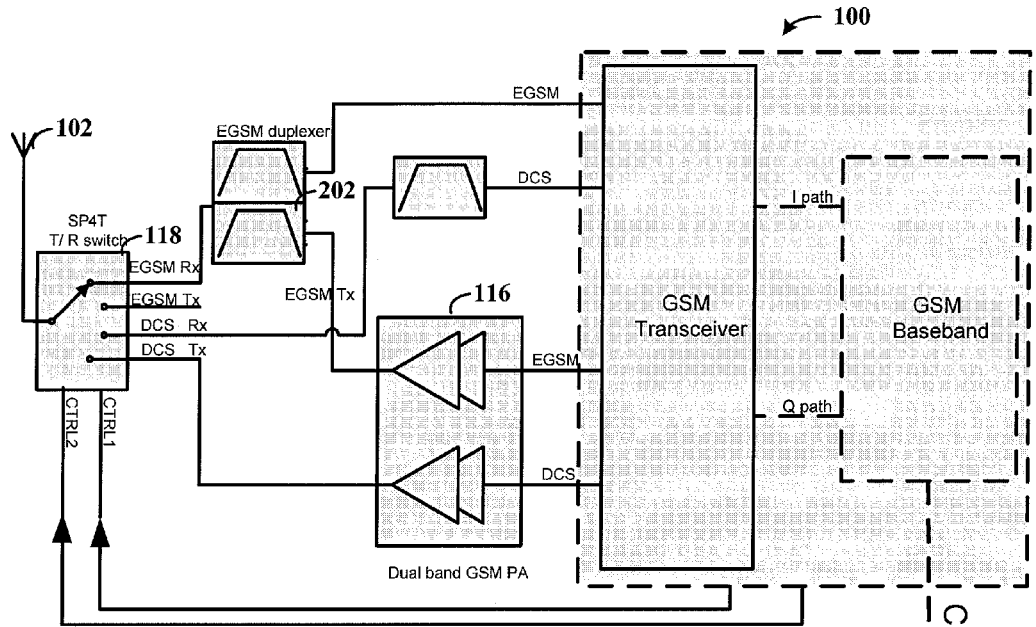
FIG. 2 shows a block diagram of a system having a duplexer, consistent with an example embodiment of the present invention.
Figure 2:
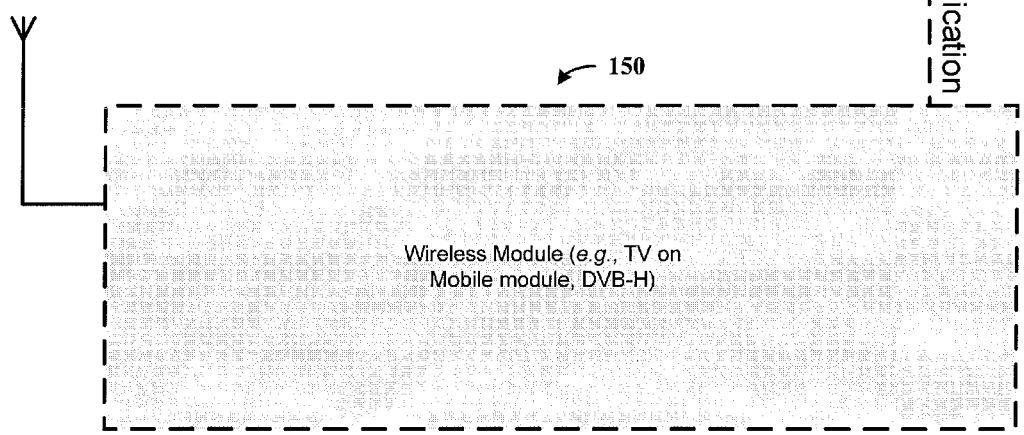

FIG. 2 shows a block diagram of a system consistent with an example embodiment of the present invention. A first side of a duplexer 202 connects to both the transmit port and the receive port of the EGSM transceiver. The other side of the duplexer connects to the EGSM receiver port of the T/R switch. A commercially available T/R switch often has an inserted low pass filter in the Tx path to satisfy the GSM specification requirement. Connecting the duplexer to the EGSM transmit port of the T/R switch can lead to extra Tx path insertion loss. Although it is still allowable to connect the other side of the duplexer to the EGSM transmit port of the T/R switch, it is not preferred here.

As such, the duplexer effectively consolidates both the transmit port and receive port of the EGSM transceiver into a single connection. This is accomplished by carefully selecting the filters for the transmit and receive portions of the duplexer, as discussed in connection with FIG. 1. Thus, although not shown, the T/R switch can be reduced to a three-throw switch.

In other embodiments, the T/R switch can be left as a four-throw switch. This can be particularly useful for maintaining compatibility with existing four-throw switch implementations.

Example control logic for a T/R switch is shown in Table 2.

TABLE 2

| State | CTRL1 | CTRL2 | RF Path |
|---|---|---|---|
| 0 | 0 | 0 | ANT-EGSM Rx |
| 1 | 0 | 1 | ANT-EGSM Rx |
| 2 | 1 | 0 | ANT-DCS Rx |
| 3 | 1 | 1 | ANT-DCS Tx |

Figure 3:
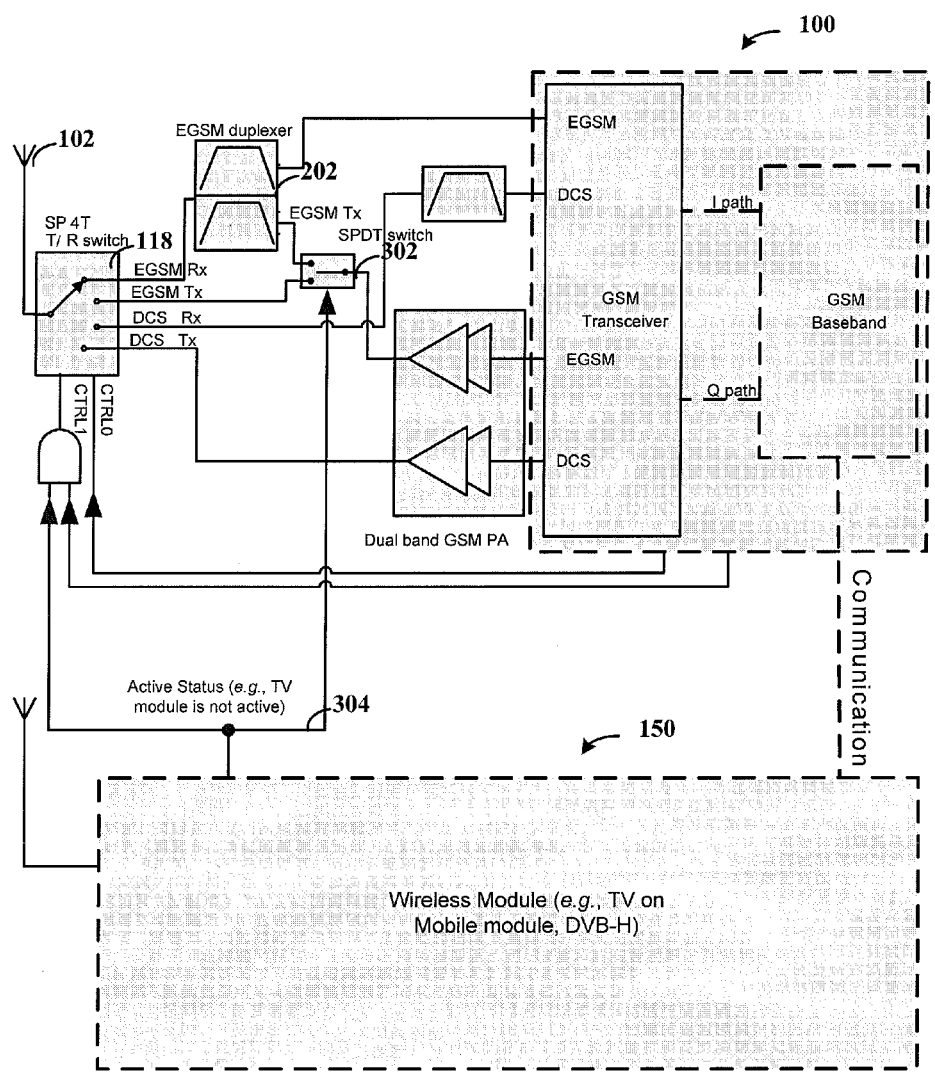
FIG. 3 shows a block diagram of a system having a duplexer and control logic responsive to an active state, consistent with an example embodiment of the present invention.

FIG. 3 shows a block diagram of a system consistent with an example embodiment of the present invention. Through a SPDT (single-pole double throw) switch 302, the PA output of EGSM connects to either the Tx port of EGSM duplexer or the EGSM Tx port of the T/R switch. This SPDT facilitates the RF matching of EGSM Tx path. The logic controlling the T/R switch responds to a signal 304 that indicates whether the second (e.g., television) module 150 is active. When the second module is active, the EGSM Rx path of the SP4T is used for both EGSM transmit and receive functions. When the second module is inactive, the EGSM Rx and EGSM TX paths of the SP4T are used for transmit and receive functions, respectively. The DCS functions are unaffected by the logic (see, e.g., Table 3).

TABLE 3

| State | TV Active | CTRL1 | CTRL2 | RF Path |
|---|---|---|---|---|
| 0 | 0 | 0 | 0 | ANT-EGSM Rx |
| 1 | 0 | 0 | 1 | ANT-EGSM Tx |
| 2 | 0 | 1 | 0 | ANT-DCS Rx |
| 3 | 0 | 1 | 1 | ANT-DCS Tx |
| 4 | 1 | 0 | 0 | ANT-EGSM Rx |
| 5 | 1 | 0 | 1 | ANT-EGSM Rx |
| 6 | 1 | 1 | 0 | ANT-DCS Rx |
| 7 | 1 | 1 | 1 | ANT-DCS Tx |

The control logic of the SPDT is show in Table 4.

TABLE 4

| State | TV Active | RF Path |
|---|---|---|
| 0 | 0 | EGSM PA - SP4T |
| 1 | 1 | EGSM PA - EGSM duplexer |

Such functionality allows for the transmit band pass filter of the duplexer to be selectively used depending on whether the second module is actively receiving data. In one instance, the transceiver can compensate for whether or not the transmit band pass filter of the duplexer is being used for transmitting. For example, filters will generally have at least a minimal amount of undesirable attenuation. This undesirable attenuation can be worse for systems in which the transmit band of the first module is very close to the receive band of the second module. It can also be problematic for relatively imprecise filter responses. Thus, the transceiver can be designed to use a higher transmit power when the duplexer is being used than when the filter is not being used.

As DVB-H is a time sliced system, there are periods between the slices where no transmission occurs, and thus, DVB-H reception is not occurring continuously. For a given burst bandwidth, the DVB-H burst duration is directly proportional to the burst size. For example, if the former is typically 15 Mb/s and the burst size is 2 Mb, then the burst duration is approximately 140 ms. This time slicing can improve TV reception time with a battery operated terminal. While the invention is not so limited, the term "TV active" is used to describe a more general active state in which the user or terminal enables or disables the TV module. Thus, the "TV active" signal need not be operated at the same time frame as the idle time between received TV slices. Instead the SPDT switching frequency can operate on a much slower time scale than the idle time between slices.

For example, a user is watching TV on a multi-purpose device that also provides cellular capabilities. When a phone call is received the user/terminal interrupts the TV module to receive that call. After the call is over, the user/terminal resumes displaying the TV programming. For such a situation, there is no overlap between the active time of the TV and the cellular phone and thus the "TV not active" signal is responsive to the user/terminal interrupting the TV to resume watching TV. During such a period, the SPDT does not cause the transmit band-pass filter of the duplexer to be used. In another example, the user continues to watch TV (possibly in muted status) during a phone call. Thus, the "TV active" signal is present during transmission and reception periods of the cellular module and causing the SPDT to select the transmit band-pass filter of the duplexer.

Often the TV module is on only when a user is not in a call. When the GSM module is in idle mode, the transmit activity can be significantly less (e.g., location update every 15 minutes). Thus, the idle time accounts for the majority of the time during which the transmit band pass filter of the duplexer in GSM is used. Accordingly, any extra transmit power used to compensate for the band pass filter is relatively small.

In a particular embodiment additional safeguards guarantee the status transition caused by "TV active" signal does not occur during the period of the EGSM Tx is actively transmitting. This is particularly important for avoiding the loss of data due to the switch interrupting an active transmission. This can be accomplished using a number of different techniques including, but not limited to, the use of logic to prevent a transition during an active transmission. For example, one or more latches or flip-flops can be used to prevent certain state transitions. The particular techniques can vary based upon the implementation.

While FIGS. 1-3 each show a dual-band cellular module, the invention is not so limited. For example, the device could also be implemented without the second (DCS) cellular capability. The configuration would remain largely the same as FIG. 2, with the DCS related filter, the SP4T switch and its control logic being removed.

Figure 4:
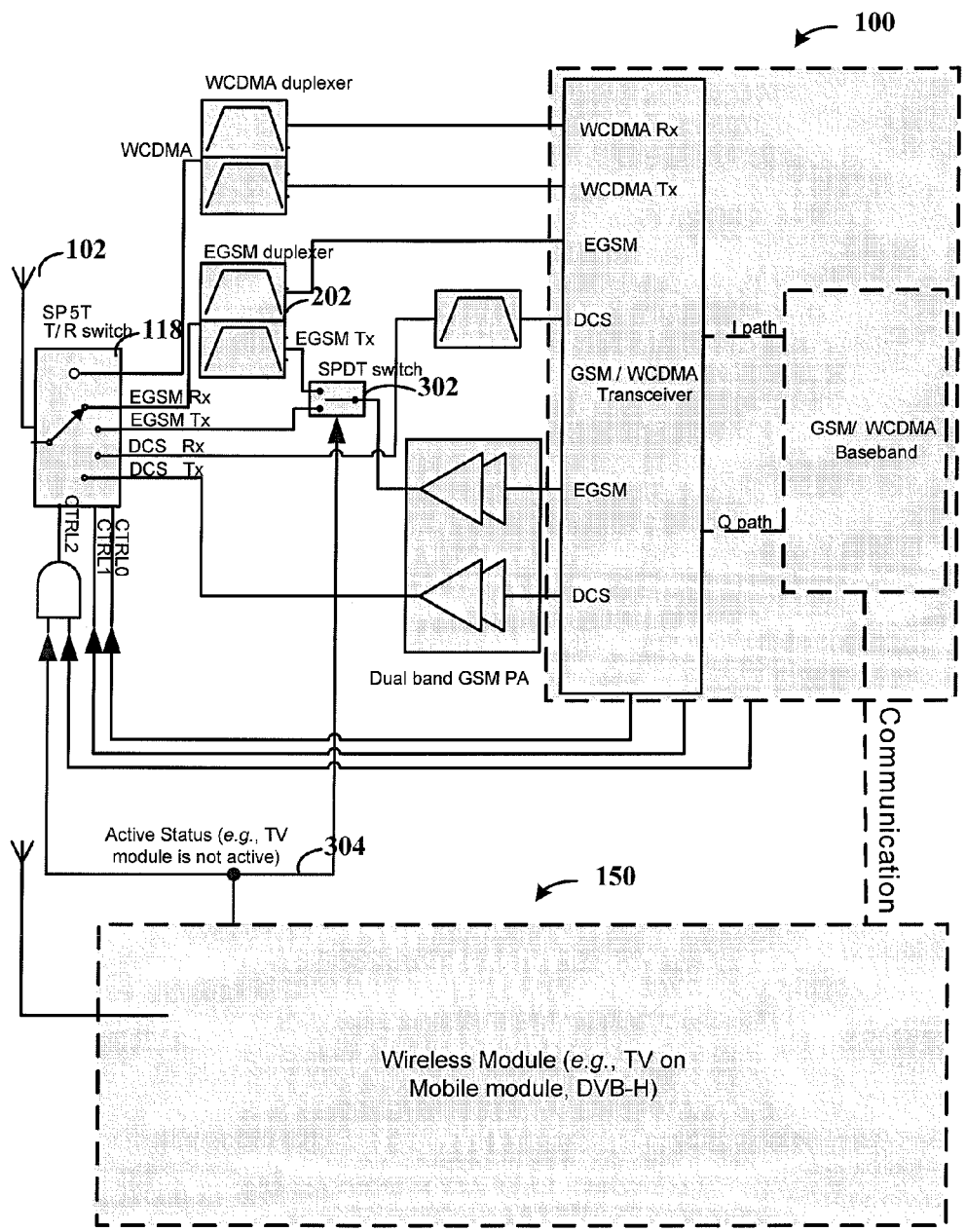
FIG. 4 shows a block diagram of a system having a duplexer and control logic responsive to an active state, consistent with an example embodiment of the present invention.

In this invention, if the cellular has both GSM/WCDMA function, WCDMA transceiver of the EGSM band will not share a duplexer with EGSM transceiver, as shown in FIG. 4. This can simplify the PCB design and the control logic that would otherwise be added for an implementation that shares the duplexer with the WCDMA and EGSM.

It should be noted that a portion or all of the control logic may reside in locations other than as FIG. 3-4 shown, such as in the chipset of TV, cellular modules, or the main controller of the wireless device.

Moreover, the method can also cover the application of the second module with both transmit and receive capability, (i.e., not restricted to a wireless module with receive capability only).

While the present invention has been described above and in the claims that follow, those skilled in the art will recognize that many changes may be made thereto without departing from the spirit and scope of the present invention.

What is claimed is:

1. For use in a system using time-division-multiple access and multiple wireless modules including a first wireless module having a first transceiver with a receiver that receives data at a first frequency band and a transmitter that sends data at a second frequency band and including a second wireless module having a receiver that receives data operating at a third frequency band, a circuit comprising:
  an antenna;
  a duplexer having a transmit band pass filter designed with a rejection band near the third frequency band;
  a first switch that,
    in a first state, routes the data from the transmitter of the first wireless module through the duplexer to a second switch and
    in a second state, routes the data from the transmitter to the second switch by bypassing the duplexer; and
  the second switch that is connected to the first switch and that
    in the first state, routes the data from the transmitter to the antenna via the duplexer, and
    in the second state, routes the data from the transmitter to the antenna while bypassing the duplexer;
  wherein the first switch is configured and arranged to operate in the first and the second states in response to a signal indicative of the second wireless module receiving data.

2. The circuit of claim 1, wherein the first switch is a single-pole double-throw (SPDT) switch having a single-pole continuously connected to the transmitter and the second switch is a single-pole four-throw (SP4T) switch having a single-pole continuously connected to the antenna.

3. The circuit of claim 1, further including logic for selecting the first switch port in response to an indication the receiver of the second wireless module is active and activity-based indications from the first wireless module.

4. The circuit of claim 1, wherein the receiver and the transmitter operate in a Global System for Mobile communications (GSM) band.

5. The circuit of claim 1, wherein the first module operates in a GSM band and the second module operates in a digital-video broadcasting mobile (DVB-H) band.

6. The circuit of claim 1, further including
  a second transceiver of the first wireless module having a receiver operating in a Digital-Cellular System (DCS) receive band and a transmitter operating in a DCS transmit band; and
  wherein, in a third state, the second switch connects the receiver of the second transceiver in the first wireless module to the antenna and, in a fourth state, the second switch connects the transmitter of the second transceiver to the antenna.

7. The circuit of claim 1, wherein an active state of the second wireless module represents a selection by one of a user and a terminal.

8. The circuit of claim 1, wherein the transmitter of the first transceiver in the first wireless module increases power of transmissions for the first state relative to power of transmission for the second state.

9. The circuit of claim 1, wherein the signal indicative of an active state of the second wireless module is from one of the second module and a main controller of the system.

10. The circuit of claim 1, wherein the first module further includes a third transceiver that operates in Wideband Code Division Multiple Access (WCDMA) mode, and that does not share a duplexer with the first transceiver of the same band.

11. The system of claim 1, wherein the first switch is a single-pole double-throw (SPDT) switch having a single-pole continuously connected to the transmitter and the second switch is a single-pole four-throw (SP4T) switch having a single-pole continuously connected to the antenna.

12. The system of claim 1, further including logic for selecting the first switch port in response to an indication the receiver of the second wireless module is active and activity-based indications from the first wireless module.

13. The system of claim 1, wherein the receiver and the transmitter operate in a Global System for Mobile communications (GSM) band.

14. The system of claim 1, wherein the first module operates in a GSM band and the second receiver operates in a digital-video broadcasting mobile (DVB-H) band.

15. For use in a device using time-division-multiple access and multiple wireless modules, a method comprising:
  generating a signal indicative of a first wireless module being active;
  in a first state that is responsive to the signal indicating the first wireless module is active, connecting a transmitter of a second wireless module to a duplexer;
  in a second state that is responsive to the signal indicating the first wireless module is not active, connecting the transmitter of the second wireless module to an antenna while bypassing the duplexer;
  connecting, in the first state, the duplexer to the antenna and connecting, in the second state, the transmitter to the antenna while bypassing the duplexer;
  wherein, the duplexer connects a receiver of the second wireless module to the antenna and includes a transmit band pass filter configured and arranged with a rejection band near an operating band of a receiver of the first wireless module.

16. The method of claim 15, wherein the first wireless module is a mobile television-based module and the second wireless module is a cellular-based module.

17. The method of claim 15, wherein a second switch has a third state that connects a receiver of a second transceiver in the second wireless module to the antenna and a fourth state that connects a transmitter of a second transceiver in the second wireless module to the antenna.

18. The method of claim 17, wherein the second switch has a fifth state that connects both a receiver and a transmitter of a third transceiver in the second wireless module to the antenna, the receiver and the transmitter of the third transceiver in the second wireless module being connected through another duplexer.

19. A system for using time-division-multiple access communications, the system comprising:
  a first wireless module having a receiver that receives data at a first frequency band and a transmitter that sends data at a second frequency band;
  a second wireless module having a receiver that receives data operating at a third frequency band:
  an antenna;
  a duplexer having a transmit band pass filter designed with a rejection band near the third frequency band;
  a first switch that, in a first state setting, routes the data from the transmitter of the first wireless module through the duplexer and that, in a second state setting, routes the data from the transmitter by bypassing the duplexer; and
  a second switch that, in the first state, routes the data from the transmitter to the antenna through the duplexer and, in the second state, routes data from the first switch to the antenna while bypassing the duplexer;
  wherein the first switch is configured and arranged to operate in the first and the second states in response to a signal indicative of the second wireless module receiving data.

* * * * *